(12) United States Patent
Dorum

(10) Patent No.: US 10,288,434 B2
(45) Date of Patent: May 14, 2019

(54) MAP-CENTRIC MAP MATCHING METHOD AND APPARATUS

(71) Applicant: HERE Global B.V., Veldhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 494 days.

(21) Appl. No.: 14/752,159

(22) Filed: Jun. 26, 2015

(65) Prior Publication Data

US 2016/0377440 A1    Dec. 29, 2016

(51) Int. Cl.
*G01C 21/30* (2006.01)
*G01C 21/34* (2006.01)
*G08G 1/01* (2006.01)

(52) U.S. Cl.
CPC ......... *G01C 21/30* (2013.01); *G01C 21/3492* (2013.01); *G08G 1/0112* (2013.01)

(58) Field of Classification Search
CPC .................................................... G06T 5/006
See application file for complete search history.

(56) References Cited

U.S. PATENT DOCUMENTS

| | | |
|---|---|---|
| 2005/0228584 A1 | 10/2005 | Adachi et al. |
| 2011/0257885 A1 | 10/2011 | Tuck et al. |
| 2013/0021382 A1 | 1/2013 | Morlock et al. |

FOREIGN PATENT DOCUMENTS

| | | |
|---|---|---|
| CN | 103235848 A | 8/2013 |
| EP | 0 593 256 A1 | 4/1994 |
| EP | 2 650 649 A1 | 10/2013 |

OTHER PUBLICATIONS

Extended European Search Report from corresponding European Patent Application No. 16176283.6 dated Nov. 23, 2016.
Wei, Hong et al.; "Fast Viterbi Map Matching with Tunable Weight Functions"; ACM Sigspatial GIS '12; Nov. 6-9, 2012, Redondo Beach, CA USA; 4 pages.
Chen, Bi Yu, et al.; "Map-Matching Algorithm for Large-Scale Low Frequency Floating Car Data"; International Journal of Geographical Information Science; vol. 28, Issue 1; Jan. 2014; pp. 22-38.
Hunter, Timothy et al.; "The Path Inference Filter: Model-Based Low-Latency of Map Matching of Probe Vehicle Data"; University of California; Publication Date Jun. 20, 2012.
Bonnifait, Philippe et al.; "Multi-Hypothesis Map-Matching Using Particle Filtering"; 16th World Congress for ITS Systems and Services; Sep. 2009; Stockholm, Sweden; pp. 1-8; 2009.

(Continued)

*Primary Examiner* — Cheung Lee
(74) *Attorney, Agent, or Firm* — Alston & Bird LLP

(57) ABSTRACT

A method, apparatus and computer program product are provided to process probe data in accordance with a map-centric map matching technique. In the context of a method, a plurality of vertices are defined along a polyline representative of a road segment such that the polyline includes one or more edges. Each edge extends between a pair of neighboring vertices. For each vertex of a respective edge, spatial searches are conducted to identify each probe point within a region about a respective vertex. For each probe point identified within a region about a respective vertex, a determination is made as to whether the probe point satisfies a projection criteria in order for the probe point to be projected onto the edge or one of the neighboring vertices between which the edge extends.

20 Claims, 9 Drawing Sheets

(56) References Cited

OTHER PUBLICATIONS

Quddus, Mohammed A. et al.; Current Map-Matching Algorithms for Transport Applications: State-of-the-art and Future Research Directions; Transportation Research Part C 15 (2007) 312-328.
Office Action for European Application No. 16 176 283.6 dated Feb. 19, 2019, 5 pages.

MAP-CENTRIC MAP MATCHING METHOD AND APPARATUS

TECHNOLOGICAL FIELD

An example embodiment relates generally to the map matching of probe points to a corresponding road segment as represented by a map and, more particularly, to the map matching of probe points to road segments in a map-centric manner.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle. Map matching for real time applications may only utilize the path of probe points up to the most recent probe point since those are the only probe points that are known. Alternatively, map matching may rely upon post-processing, such as in instances in which the probe points captured by a plurality of GPS systems or navigation systems are matched to the road segments represented by a map for traffic estimation or other purposes. The accuracy of the map matching provided by post-processing may be improved relative to the map matching for real time applications since probe points captured subsequent in time to the probe point currently being processed are also known and may be referenced during the post-processing.

A variety of probe-centric map matching techniques have been developed. These map matching techniques include map matching techniques that utilize geometric analysis including point-to-point analysis, point-to-curve analysis and trajectory techniques. Other map matching techniques utilize a topological analysis of the road network to improve accuracy and performance. Some map matching techniques utilize probabilistic map-matching algorithms. The probabilistic map-matching algorithms attempt to identify the most probable road segment in some confidence region about a respective probe point. Additionally or alternatively, probabilistic map-matching algorithms may attempt to identify the most probable path in addition to the most probable road segment. The probabilistic map-matching algorithms may include, for example, Viterbi and hidden Markov model techniques. Further, map-matching techniques may include other types of map-matching algorithms including those that utilize Kalman and extended Kalman based techniques and those that utilize particle filters.

Whether performed in real time or as a post-processing technique, map matching has been a probe-centric process in which each probe point is analyzed to identify the closest road segment and the projection of the probe point onto the closest road segment. In order to identify the closest road segment, a separate spatial search is generally conducted for each probe point; even in instances in which a probe point is spaced a substantial distance from any road segment. Thus, the number of spatial searches to be conducted is generally proportional to the number of probe points.

Spatial searches are computationally expensive. For example, probe-centric map matching techniques for large probe data sets, such as millions of probe points, can incur substantial execution time and costs since the number of spatial searches is proportional to the number of probe points. Thus, map matching and, in particular, the spatial searches for each of the probe points may become a limiting factor at least for real time applications.

BRIEF SUMMARY

A method, apparatus and computer program product are provided in accordance with an example embodiment in order to process probe data in accordance with a map-centric map matching technique. By utilizing a map-centric map matching technique, the method, apparatus and computer program product of an example embodiment may, in many instances, conduct fewer spatial searches since the spatial searches are no longer proportional in number to the number of probe points and, instead, are based upon the length of the road segments of the map to which the probe points are to be matched. By reducing, in many instances, the number of spatial searches, the method, apparatus and computer program product of an example embodiment may map match the probe points in a more efficient manner that requires fewer computational resources and time, thereby benefitting real time as well as other applications. Further, the map-centric map matching technique of the method, apparatus and computer program product of an example embodiment of the present invention is advantageously scalable as the number of probe points increases, thereby facilitating map matching for a variety of applications including crowd sourced applications that may generate a relatively large number of probe points.

In an example embodiment, a method is provided that includes defining a plurality of vertices along the polyline representative of a road segment such that the polyline includes one or more edges. Each edge extends between a pair of neighboring vertices. For each vertex of a respective edge, the method spatially searches to identify each probe point within a region about a respective vertex. For each probe point identified within a region about a respective vertex, the method includes determining whether the probe point satisfies a projection criteria in order for the probe point to be projected onto the edge or one of the neighboring vertices between which the edge extends. In an example embodiment, the projection criterion includes a projection distance of the probe being less than a previous map matched distance in an instance in which the probe point has been previously projected.

The method of an example embodiment also includes determining a spatial search separation distance at least partially based upon a map matching tolerance. In this example embodiment, the method defines a plurality of vertices by inserting one or more internal vertices along the polyline in an instance in which a length of an edge exceeds the spatial search separation distance.

The method of an example embodiment determines whether the probe point satisfies the projection criteria by determining, in an instance in which one or both of the neighboring vertices of the respective edge is an end polyline vertex, whether the probe point satisfies an end vertex projection criteria in order for the probe point to be projected onto the end polyline vertex. In an instance in which one or both of the neighboring vertices of the respective edge is an internal vertex, the method of this example embodiment determines whether the probe point satisfies the projection criteria by also determining whether the probe point satisfies an internal vertex projection criteria in order for the probe point to be projected onto the internal vertex. Additionally, the method of this example embodiment determines whether the probe point satisfies the projection criteria by determining whether the probe point satisfies an edge projection criteria in order for the probe point to be projected onto the edge.

In regards to determining whether the probe point satisfies the end vertex projection criteria, the method of an example embodiment determines a projection parameter for each edge that intersects at the end polyline vertex. The projection parameter for a respective edge parametrically expresses a projection point at which the probe point is projected onto the end polyline vertex, the respective edge or an extension of the respective edge beyond the end polyline vertex. The method of this example embodiment also determines a difference angle for each allowable turn maneuver from the road segment onto another road segment and determines a projection distance from the probe point to the end polyline vertex. For each allowable turn maneuver, the method of this example embodiment projects the probe point onto the end polyline vertex in an instance in which the projection parameter satisfies a predefined criteria, the difference angle is within a heading tolerance, the projection distance is within a map matching tolerance and, in an instance in which the probe point has been previously projected, the projection distance of the probe point to the end polyline vertex is less than a previous map-matched distance.

In regards to determining whether the probe point satisfies the internal vertex projection criteria, the method of an example embodiment determines a projection parameter for each edge that intersects at the internal vertex. The projection parameter for a respective edge parametrically expresses a projection point at which the probe point is projected onto the internal vertex, the respective edge or an extension of the respective edge beyond the internal vertex. The method of this example embodiment also determines a difference angle for the probe point and determines a projection distance from the probe point to each internal vertex. The method of this example embodiment also projects a probe point onto a respective internal vertex in an instance in which the projection parameter satisfies a predefined criteria, the difference angle is within a heading tolerance, the projection distance is within a map matching tolerance and, in an instance in which the probe point has been previously projected, the projection distance of the probe point to the respective internal vertex is less than the previous map-matched distance.

In regards to determining whether the probe point satisfies the edge projection criteria, the method of an example embodiment determines an angle between a heading associated with the probe point and the edge. The method of this example embodiment also determines a projection distance from the probe point to a projection point along the edge and determines a projection parameter that parametrically expresses the projection point. The method of this example embodiment projects the probe point onto the edge in an instance in which the angle is within a heading tolerance, the projection distance is within a map matching tolerance, the projection parameter is within a predefined range and, in an instance in which the probe point has been previously projected, the projection distance of the probe point to the edge is less than a previous map-matched distance.

In another example embodiment, an apparatus is provided that includes at least one processor and at least one memory including computer program code with the at least one memory and the computer program code configured to, with the processor, cause the apparatus to at least define a plurality of vertices along the polyline representative of a road segment such that the polyline includes one or more edges. Each edge extends between a pair of neighboring vertices. For each vertex of a respective edge, the at least one memory and the computer program code are configured to, with the processor, cause the apparatus of the example embodiment to spatially search to identify each probe point within a region about a respective vertex. For each probe point identified within the region about a respective vertex, the at least one memory and the computer program code are configured to, with the processor, cause the apparatus of the example embodiment to determine whether the probe point satisfies a projection criteria in order for the probe point to be projected onto the edge or one of the neighboring vertices between which the edge extends. The projection criteria of an example embodiment includes a projection distance of the probe point being less than the previous map-matched distance in an instance in which the probe point had been previously projected.

The at least one memory and the computer program code are further configured to, with the processor, cause the apparatus of an example embodiment to determine a spatial search separation distance at least partially based upon a map-matching tolerance. The at least one memory and the computer program code are also configured to, with the processor, cause the apparatus of this example embodiment to define the plurality of vertices by inserting one or more internal vertices along the polyline in an instance in which a length of an edge exceeds the spatial search separation distance.

The at least one memory and the computer program code are configured to, with the processor, cause the apparatus of an example embodiment to determine whether the probe point satisfies the projection criteria in an instance in which one or both of the neighboring vertices of the respective edges are end polyline vertex by determining whether the probe point satisfies an end vertex projection criteria in order for the probe point to be projected onto the end polyline vertex. The at least one memory and the computer program code are also configured to, with the processor, cause the apparatus of this example embodiment to determine whether the probe point satisfies the projection criteria in an instance in which one or both of the neighboring vertices of the respective edges are internal vertex by determining whether the probe point satisfies an internal vertex projection criteria in order for the probe point to be projected onto the internal vertex. The at least one memory and computer program code are further configured to, with the processor, cause the apparatus of this example embodiment to determine whether the probe point satisfies the projection criteria by determining whether the probe point satisfies an edge projection criteria in order for the probe point to be projected onto the edge.

The at least one memory and the computer program code are configured to, with the processor, cause the apparatus of an example embodiment to determine whether the probe point satisfies the end vertex projection criteria by determining a projection parameter for each edge that intersects at the end polyline vertex. The projection parameter for a respective edge parametrically expresses a projection point at which the probe point is projected onto the end polyline vertex, the respective edge or an extension of the respective edge beyond the end polyline vertex. In this example embodiment, the determination of whether the probe point satisfies the end vertex criteria also includes determining a difference angle for each allowable turn maneuver from the road segment onto another road segment and by determining a projection distance from the probe point to the end polyline vertex. For each allowable turn maneuver, the at least one memory and the computer program code are also configured to, with the processor, cause the apparatus of this example embodiment to project the probe point onto the end polyline vertex in an instance in which the projection parameter satisfies a predefined criteria, the difference angle is within a heading tolerance, the projection distance is within a map-matching tolerance and, in an instance in which the probe point has been previously projected, the projection distance of the probe point to the end polyline vertex is less than a previous map-matched distance.

The at least one memory and the computer program code are configured to, with the processor, cause the apparatus of an example embodiment to determine whether the probe point satisfies the internal vertex projection criteria by determining a projection parameter for each edge that intersects at the internal vertex. The projection parameter for a respective edge parametrically expresses a projection point at which the probe point is projected onto the internal vertex, the respective edge or an extension of the respective edge beyond the internal vertex. The determination as to whether the probe point satisfies the internal vertex projection criteria also includes determining a difference angle for the probe point and by determining a projection distance from the probe point to each internal vertex. The at least one memory and the computer program code are also configured to, with the processor, cause the apparatus of this example embodiment to project the probe point onto a respective internal vertex in an instance in which the projection parameter satisfies a predefined criteria, the difference angles within a heading tolerance, the projection distance is within a map-matching tolerance and, in an instance in which the probe point has been previously projected, the projection distance to the probe point to the respective internal vertex is less than the previous map-matched distance.

The at least one memory and the computer program code are configured to, with the processor, cause the apparatus of an example embodiment to determine whether the probe point satisfies the edge projection criteria by determining an angle between the heading associated with the probe point and the edge. The at least one memory and the computer program code are also configured to, with the processor, cause the apparatus of this example embodiment to determine a projection distance from the probe point to a projection point along the edge and to determine a projection parameter that parametrically expresses the projection point. The at least one memory and the computer program code are further configured to, with the processor, cause the apparatus of this example embodiment to project the probe point onto the edge in an instance in which the angle is within a heading tolerance, the projection distance within a map-matching tolerance, the projection parameter is within a predefined range and, in an instance in which the probe point has been previously projected, the projection distance from the probe point to the edge is less than the previous map-matched distance.

In a further example embodiment, a computer program product is provided that includes at least one non-transitory computer-readable storage media having computer-executable program code portion stored therein with the computer-executable program code portions including program code instructions configured to define a plurality of vertices along a polyline representative of a road segment such that the polyline includes one or more edges. Each edge extends between a pair of neighboring vertices. The computer-executable program code portions of this example embodiment also include program code instructions configured, for each vertex of respective edge, to spatially search to identify each probe point within a region about a respective vertex. The computer-executable program portions of this example embodiment further include program code instructions configured, for each probe point identified within the region about a respective vertex, to determine whether the probe point satisfies a projection criteria in order for the probe point to be projected onto the edge or one of the neighboring vertices between which the edge extends.

The computer-executable program code portions of an example embodiment further include program code instructions configured to determine a spatial search separation distance at least partially based upon a map-matching tolerance. The program code instructions of this example embodiment that are configured to define the plurality of vertices include program code instructions configured to insert one or more internal vertices along the polyline in an instance in which a length of an edge exceeds the spatial search separation distance.

The program code instructions configured to determine whether the probe point satisfies the projection criteria include, in an example embodiment, program code instructions configured to, in an instance in which one or both of the neighboring vertices of the respective edges are an end polyline vertex, determine whether the probe point satisfies an end vertex projection criteria in order for the probe point to be projected onto the end polyline vertex. In an instance in which one or both of the neighboring vertices of the respective edges are an internal vertex, the program code instructions of this example embodiment are also configured to determine whether the probe point satisfies an internal vertex projection criteria in order for the probe point to be projected onto the internal vertex. The program code instructions of this example embodiment are further configured to determine whether the probe point satisfies an edge projection criteria in order for the probe point to be projected onto the edge.

The program code instruction configured to determine whether the probe point satisfies the end vertex projection criteria include program code instructions configured to determine a projection parameter for each edge that intersects at the end polyline vertex. The projection parameter for a respective edge parametrically expresses a projection point at which the probe point is projected onto the end polyline vertex, the respective edge or an extension of the respective edge beyond the end polyline vertex. The program code instructions of this example embodiment are also configured to determine the difference angle for each allowable turn maneuver from the road segment onto another road segment and to determine a projection distance from the probe point to the end polyline vertex. For each allowable turn maneuver, the program code instructions of this example embodiment are also configured to project the probe point onto the end polyline vertex in an instance in which the projection parameter satisfies a predefined criteria, the difference angle is within a heading tolerance, the projection distance is within a matching tolerance and, in an instance in which the probe point has been previously projected, the projection distance of the probe point to the polyline vertex is less than a previous map-matched distance.

The program code instructions configured to determine whether the probe point satisfies the internal vertex projection criteria include, in an example embodiment, program code instructions configured to determine a projection parameter for each edge that intersects at the internal vertex. The projection parameter for a respective edge parametrically expresses a projection point at which the probe point is projected onto the internal vertex, the respective edge or an extension of the respective edge beyond the internal vertex. The program code instructions of this example embodiment are also configured to determine a difference angle for the probe point and to determine a projection distance from the probe point to each internal vertex. The program code instructions of this example embodiment are also configured to project the probe point onto a respective internal vertex in an instance in which the projection parameter satisfies a predefined criteria, the difference angle is within a heading tolerance, the projection distance is within a map-matching tolerance and, in an instance in which the probe point has been previously projected, the projection distance from the probe point to the respective internal vertex is less than the previous map-matched distance.

The program code instructions configured to determine whether the probe points satisfies the edge projection criteria include, in an example embodiment, program code instructions configured to determine an angle between a heading associated with the probe point and the edge. The program code instructions to this example embodiment are also configured to determine a projection distance from the probe point to a projection point along the edge and to determine a projection parameter that parametrically expresses a projection point. The program code instructions of this example embodiment are further configured to project the probe point onto the edge in an instance in which the angle is within a heading tolerance, the projection distance is within a map-matching tolerance, the projection parameter is within a predefined range and, in an instance in which the probe point has been previously projected, the projection distance from the probe point to the edge is less than a previous map-matched distance.

In yet another example embodiment, an apparatus is provided that includes means for defining a plurality of vertices along the polyline representative of a road segment such that the polyline includes one or more edges. Each edge extends between a pair of neighboring vertices. For each vertex of a respective edge, the apparatus of the example embodiment includes means for spatially searching to identify each probe point within a region about a respective vertex. For each probe point identified within the region about a respective vertex, the apparatus of this example embodiment includes means for determining whether the probe point satisfy the projection criteria in order for the probe point to be projected onto the edge or one of the neighboring vertices between which the edge extends.

BRIEF DESCRIPTION OF THE DRAWINGS

Figure 1:
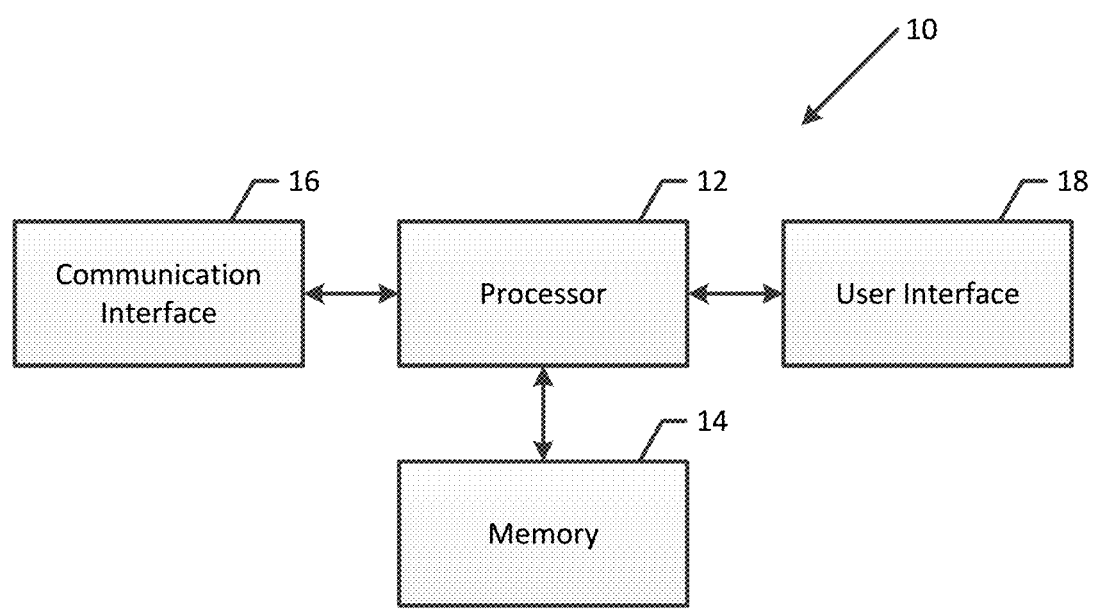
Figure 2:
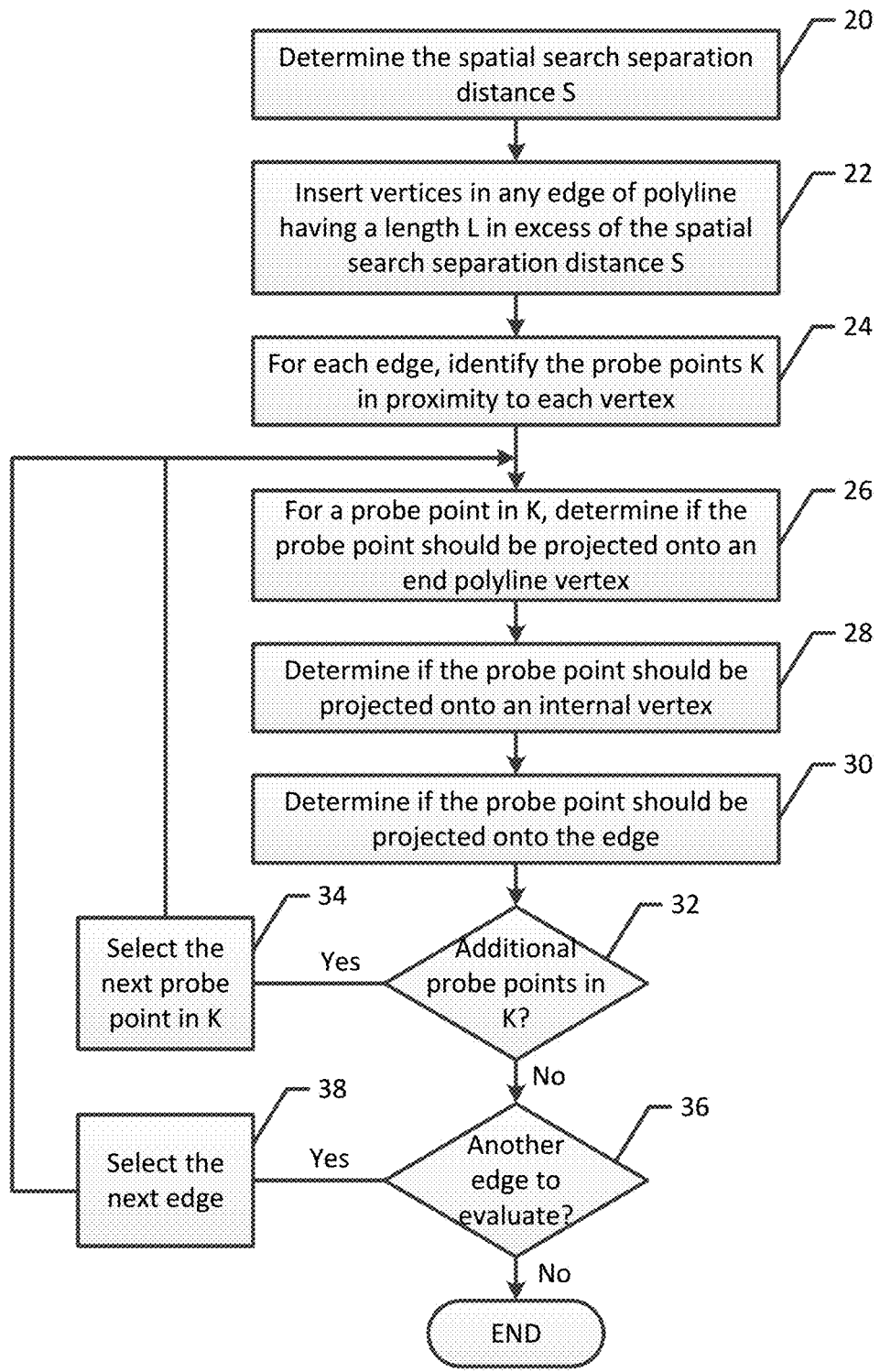
Figure 3:
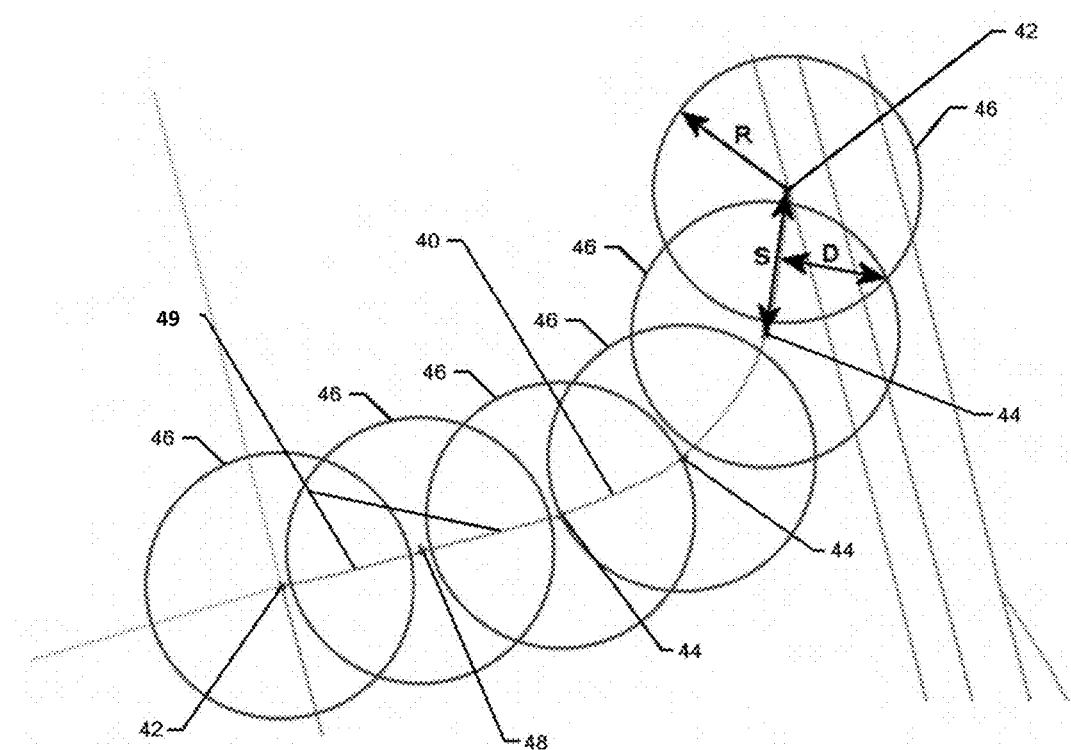
Figure 4:
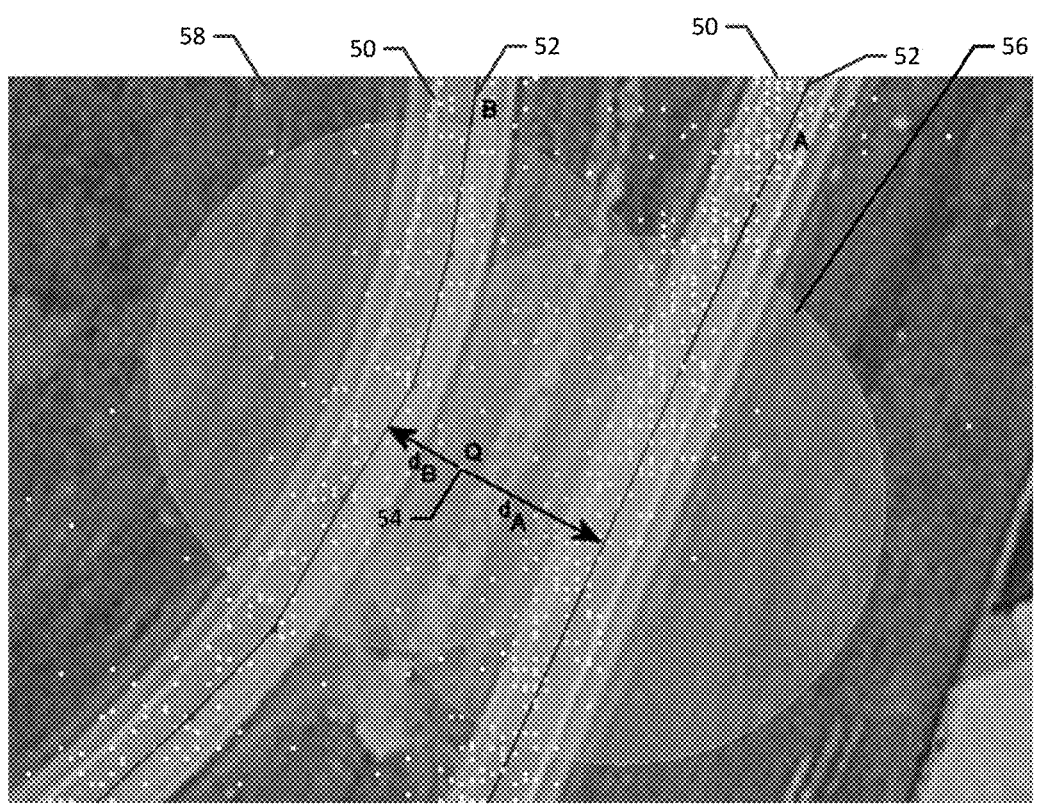
Figure 5:
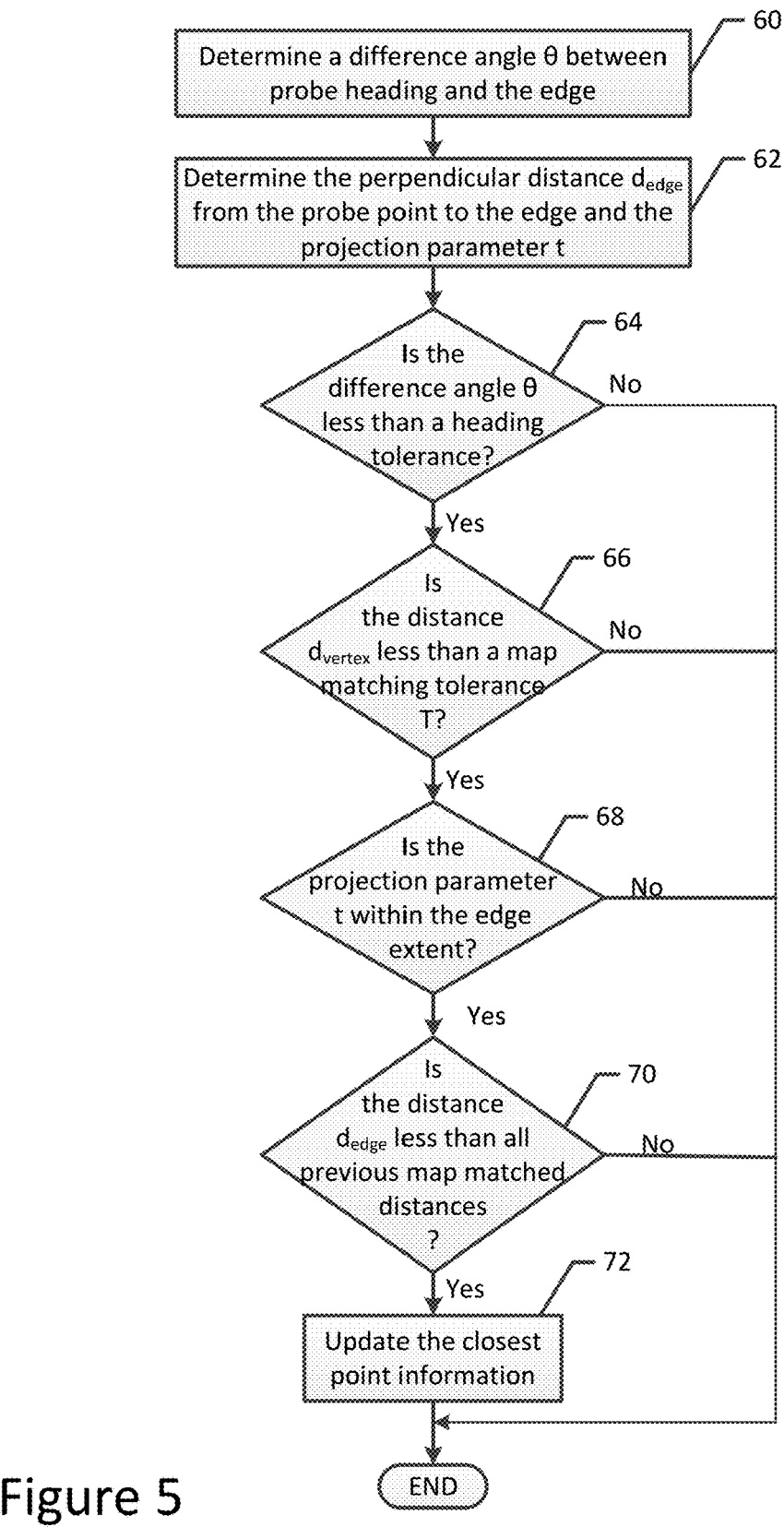
Figure 6:
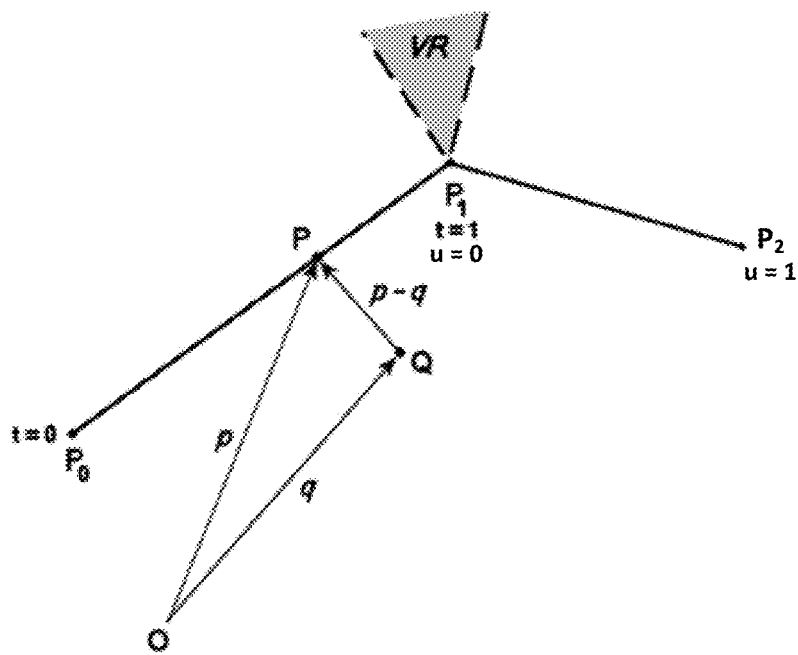
Figure 7:
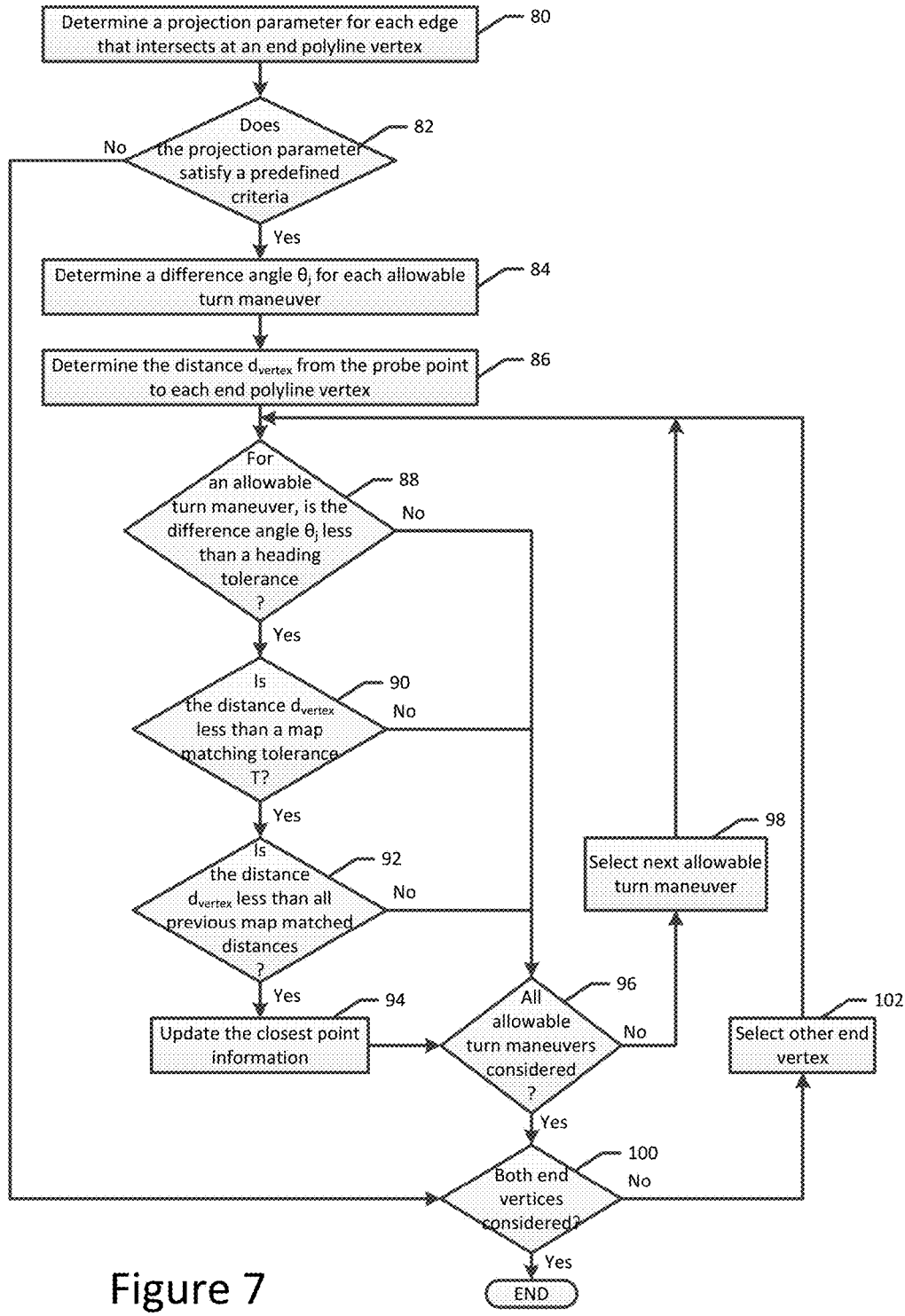
Figure 8:
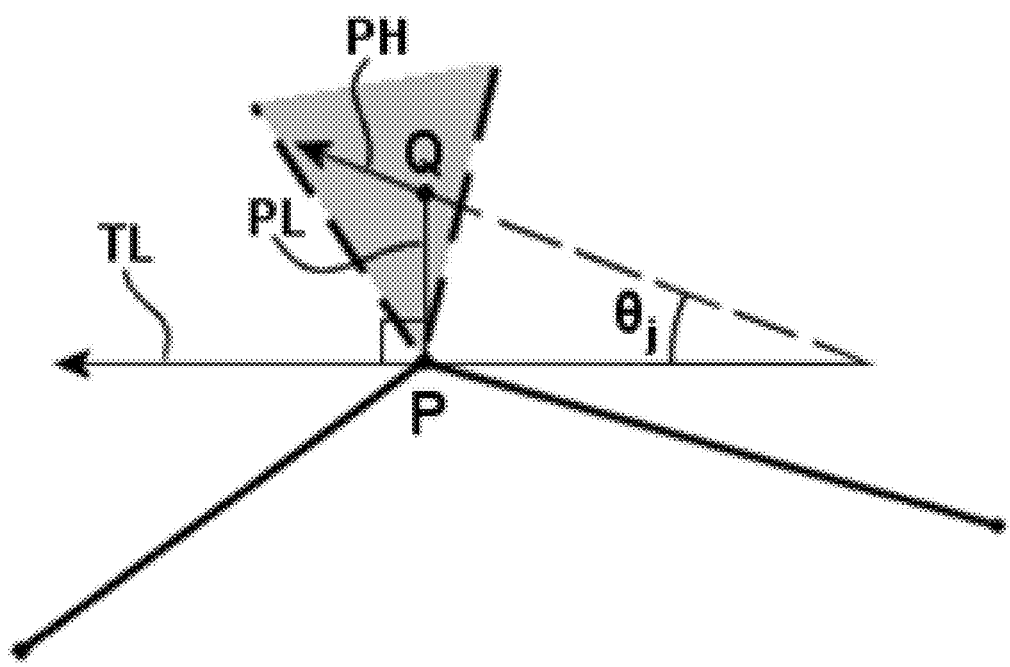
Figure 9:
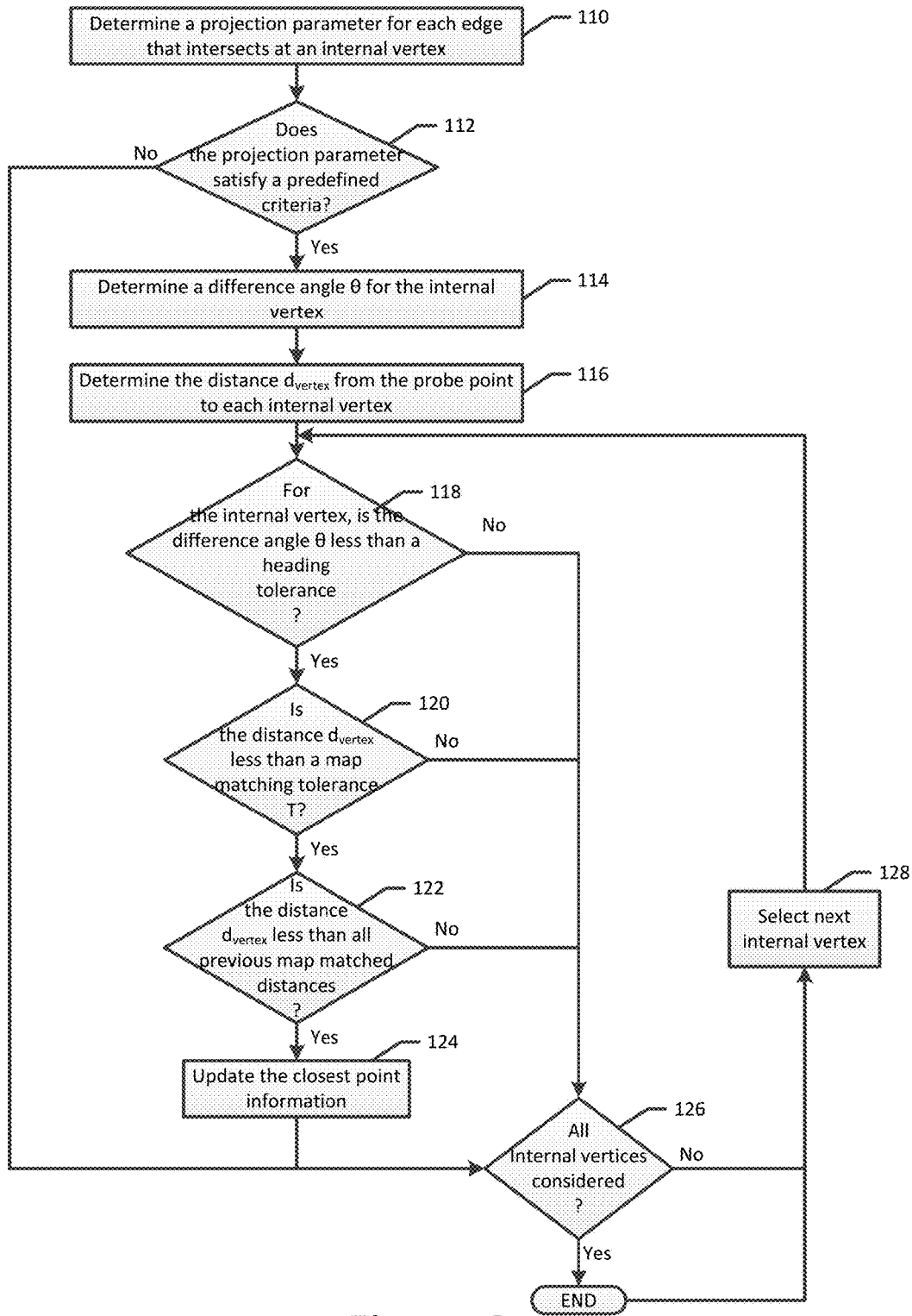

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present invention;

FIG. 2 is a flowchart illustrating the operations performed, such as by the apparatus of FIG. 1, in accordance with an example embodiment of the present invention;

FIG. 3 depicts a plurality of spatial searches conducted about respective vertices of a polyline in accordance with an example embodiment of the present invention;

FIG. 4 illustrates the projection distances of a probe point onto two different road segments in accordance with an example embodiment of the present invention;

FIG. 5 is a flowchart illustrating the operations performed, such as by the apparatus of FIG. 1, in order to determine whether the probe point satisfies the edge projection criteria in accordance with an example embodiment of the present invention;

FIG. 6 illustrates the projection of a probe point onto an edge of a polyline in accordance with an example embodiment of the present invention;

FIG. 7 is a flowchart illustrating the operations performed, such as by the apparatus of FIG. 1, in order to determine whether the probe point satisfies the end vertex projection criteria in accordance with an example embodiment of the present invention;

FIG. 8 illustrates the determination of a difference angle for a probe point within a vertex projection region in accordance with an example embodiment of the present invention; and FIG. 9 is a flowchart illustrating the operations performed, such as by the apparatus of FIG. 1, in order to determine whether the probe point satisfies the internal vertex projection criteria in accordance with an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment in order to allow probe points to be matched to road segments as represented by a map in a computationally efficient manner. In this regard, the method, apparatus and computer program product of an example embodiment utilize a map-centric map matching technique such that the number of spatial searches to be conducted is not proportional to the number of probe points, but is, instead, based upon the length of the road segments as represented by the map. Since the map matching may be performed more efficiently in a map-centric manner, the method, apparatus and computer program product of an example embodiment may be configured to support not only post-processing applications, but also real time applications that demand relatively timely map matching of the probe points.

The apparatus of an example embodiment may be embodied by a variety of computing devices including, for example, such as a navigation system, an advanced driver assistance system (ADAS), a GPS system or the like. Additionally or alternatively, the apparatus may be embodied in other types of computing devices, such as a server, a personal computer, a computer workstation, a laptop computer, a plurality of networked computing devices or the like, that are configured to analyze probe points, such as for traffic estimation or other purposes. In this regard, FIG. 1 depicts the apparatus 10 of an example embodiment that may be embodied by various computing devices including those identified above. As shown, the apparatus of an example embodiment may include, may be associated with or may otherwise be in communication with a processor 12 and a memory device 14 and optionally a communication interface 16 and/or a user interface 18.

In some embodiments, the processor 12 (and/or co-processors or any other processing circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 10 may be embodied by a computing device including those described above. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment also optionally includes a communication interface 16 that may be any means such as a device or circuitry embodied in either hardware or a combination of hardware and software that is configured to receive and/or transmit data from/to other electronic devices in communication with the apparatus, such as by being configured to receive probe data from a database, cloud storage or other external memory device and/or to provide a representation of the road geometry to an in-vehicle global positioning system (GPS), in-vehicle navigation system, a personal navigation device (PND), a portable navigation device or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication.

As illustrated in FIG. 1, the apparatus 10 may also optionally include or otherwise be in communication with a user interface 18. The user interface may include a touch screen display, a keyboard, a mouse, a joystick or other input/output mechanisms. In some embodiments, the user interface, such as a display, speakers, or the like, may also be configured to provide output to the user. In this example embodiment, the processor 12 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 14 and/or the like).

In order to provide for map matching of probe data as represented by a plurality of probe points in a map-centric fashion, reference is now made to FIG. 2 in which the operations performed, such as by the apparatus 10 of FIG. 1, are depicted. In this regard, the apparatus of an example embodiment includes means, such as the processor 12, the memory 14, the communication interface 16 or the like, for receiving or otherwise having access to one or more probe points. In this regard, the apparatus, such as the processor, the communication interface or the like, may be configured to receive one or more probe points from the system, such as a GPS system, a navigation system or the like, that captured the probe points or the apparatus, such as the processor, the memory or the like, may be configured to receive or otherwise have access to one or more probe points that have been previously captured and are stored, either in the memory associated with the apparatus or by another memory device, such as a server, a database, cloud storage or the like.

Additionally, the apparatus 10 includes means, such as the processor 12, the memory 14, the communication interface 16 or the like, for receiving or otherwise having access to a map including a plurality of road segments. In this regard, the road segments may be represented by respective polylines. The polylines may extend between end polyline vertices at which a road segment either terminates or intersects another road segment as represented by another polyline. As described below, the polylines are each comprised of one or more edges. A polyline may also be an approximation to an analytical two dimensional (2D) or three dimensional (3D) curve describing each road segment, such as e.g. a B-spline, Bezier curve or clothoid curve. Map matching to a road network modeled by analytical curves is typically performed by first map matching to a polyline approximation of the curves. The polyline map match location is then used as the initial estimate for a numerical optimization process for determining the projection point on the analytical curve.

As the map matching technique of the present application is map-centric, spatial searches are conducted for probe points as described below within regions about each of the vertices of a polyline with the probe points identified during the spatial searches being considered for projection onto the polyline. The probe points may be put into computationally efficient spatial search data structures such as, for example, a kd-tree to optimize (e.g., minimize the number of operations needed for) spatial search operations, such as nearest neighbor and range searches. As the spatial searches are conducted within regions about the vertices of a polyline, the polylines representative of the road segments of a map are evaluated and additional vertices are potentially inserted in order to ensure that the spatial searches for probe points proximate vertices of a polyline capture all desired probe points, such as all probe points within a reasonable proximity to the road segments. In this regard, the apparatus 10 of an example embodiment includes means, such as the processor 12 or the like, for defining a plurality of vertices along a polyline representative of a road segment. Following the definition of the vertices, the polyline includes one or more edges with each edge extending between a pair of neighboring vertices. For example, a polyline may extend between a pair of end polyline vertices and additional internal vertices may be defined along the polyline between the end polyline vertices.

As shown in block 20 of FIG. 2, the apparatus 10 of an example embodiment includes means, such as the processor 12 or the like, for determining a spatial search separation distance S. The apparatus of this example embodiment also includes means, such as the processor or the like, for inserting vertices, such as one or more internal vertices, along the polyline, such as within any edge of the polyline have a length L that is in excess of the spatial search separation distance S. See block 22. In accordance with an example embodiment of the present invention, the internal vertices are defined, such as by the processor, such that the length of each edge of the polyline is no greater than the spatial search separation distance S. With reference to the example of FIG. 3, a polyline 40 extends in an arcuate fashion between a pair of end polyline vertices 42 and includes one or more internal vertices 44. One or more additional internal vertices 48 may then be inserted along an edge between any pair of vertices (either end polyline vertices or internal vertices 44) that define an edge having a length L in excess of the spatial search separation distance S such that the polyline is divided into one or more additional edges, each of which extends between a pair of neighboring vertices and has an edge length not exceeding the spatial search separation distance S. FIG. 3 depicts an edge 49 between end vertex 42 and internal vertex 44 having a length L that initially exceeded the spatial search separation distance S being split into two edges by inserting a new internal vertex 48 in the middle of edge 49 so that each new edge does not exceed the spatial search separation distance S.

The apparatus 10 of an example embodiment also includes means, such as the processor 12 or the like, for spatially searching, for each vertex of a respective edge, to identify each probe point within a region about a respective vertex. See block 24 of FIG. 2. The probe point(s) within a region about a respective vertex may be designated as the set of probe points κ. By basing the region in which to spatially search for probe points upon the vertices of an edge, the spatial search is map-centric and, therefore, may be conducted in a more efficient manner in many instances since the number of spatial searches is not dependent upon or proportional to the number of probe points. As shown in the example embodiment of FIG. 3, a spatial search may be conducted in the circular region 46 surrounding each vertex 42, 44 in order to identify probe points proximate the polyline and, in particular, proximate the portion of the polyline centered about the respective vertex. Although the region in which the spatial search is conducted may be of any size and shape and may vary from one vertex to another, the region in which the spatial search is conducted may identical in size and shape for each vertex, such as the equally sized circular spatial search regions of FIG. 3. In this regard, the polyline 40 of FIG. 3 includes two end polyline vertices 42 and three internal vertices 44 with spatial searches conducted in circles 46 of radius R centered about each of the five different vertices.

In order to ensure that a sufficient number of spatial searches are conducted along the length of the polyline in order to identify all probe points proximate the polyline, the spatial search separation distance S which defines the separation distance along the edge of a polyline between neighboring vertices may be at least partially based upon a map matching tolerance T, that is, the predefined distance within which a probe point should be map matched to a polyline. As shown in the example embodiment of FIG. 3, the vertices along the polyline are separated by a spatial search separation distance S and the dimensions of each spatial search region, such as the radius R of a circular spatial search region 46 centered about a respective vertex, are sized such that the search region about each respective vertex overlaps with the search regions defined for the immediately neighboring vertices in a manner in which the shortest distance D from the polyline to the intersection of the adjacent search regions, that is, the perpendicular distance from the polyline to the point of intersection of the adjacent search regions, is always greater than the map matching tolerance T. In this regard, D is greater than T and the spatial search separation distance S may be determined from the equation of $R^2=T^2+(S/2)^2$ as $S=2(R^2-T^2)^{1/2}$. As such, the probe points that are within a perpendicular distance D of the polyline will be identified within one or, in some instances, two search regions about respective vertices. As also illustrated in FIG. 3, the search region centered about each respective vertex overlaps the search regions centered about the immediately neighboring vertices, but does not intersect the search regions centered about the other vertices along the polyline, such as the search regions centered about the vertices that are spaced from the vertex in question by one or more intermediate vertices. Thus, each edge of the polyline that extends by more than the spatial search separation distance S without an internal vertex to subdivide the edge is divided by one or more internal vertices such that each edge segments that result have a length that is no greater than the spatial search separation distance S.

The probe points that are identified are then processed to determine if the probe points should be projected onto an end polyline vertex of an edge of the polyline, an internal vertex of the edge of the polyline or onto the edge itself. In this regard, for each probe point identified within the region about a respective vertex, the apparatus 10 includes means, such as the processor 12 or the like, for determining whether the probe point satisfies a projection criteria, such as may be defined by an objective function, in order for the probe point to be projected onto the edge or one of the neighboring vertices between which the edge extends. This process may be repeated for each probe point identified with respect to a respective edge and, in turn, for each edge of the polyline, thereby projecting the probe points onto the length of the polyline.

The apparatus 10, such as the processor 12, may be configured to determine whether a probe point satisfies a projection criteria in various manners. In the embodiment of FIG. 2, however, the apparatus, such as the processor, is configured to separately determine whether the probe point satisfies an end vertex projection criteria, an internal vertex projection criteria and an projection criteria in order determine whether the probe point should be projected onto an end polyline vertex, an internal vertex or the edge, respectively. In this regard and as shown in block 26 of FIG. 2, the apparatus of an example embodiment includes means, such as the processor or the like, for determining, for a probe point in K, whether the probe point should be projected onto an end polyline vertex. More particularly, the apparatus of an example embodiment may include means, such as the processor or the like, for determining, in an instance in which one or both of the neighboring vertices of the respective edge is an end polyline vertex, whether the probe point satisfies an end vertex projection criteria in order for the probe point to be projected onto the end polyline vertex. In an instance in which the respective edge for which the probe points are being analyzed does not include an end polyline vertex, the apparatus, such as the processor, may be configured to quickly determine that the probe point should not be projected onto an end polyline vertex.

As shown in block 28 of FIG. 2, the apparatus 10 of this example embodiment also includes means, such as the processor 12 or the like, for determining if the probe point should be projected onto an internal vertex of the respective edge. In this regard, the apparatus of this example embodiment may include means, such as the processor or the like, for determining, in an instance in which one or both of the neighboring vertices of the respective edge is an internal vertex, whether the probe point satisfies an internal vertex projection criteria in order for the probe point to be projected on the internal vertex. Since internal vertices are shared by edges, it is only necessary to evaluate the internal vertex projection criteria once per vertex. In an instance in which the respective edge for which the probe points are being analyzed does not include an internal polyline vertex, the apparatus, such as the processor, may be configured to quickly determine that the probe point should not be projected onto an internal polyline vertex. Further, the apparatus of this example embodiment includes means, such as the processor or the like, for determining if the probe point should be projected onto the edge itself. See block 30. In this regard, the apparatus of this example embodiment includes means, such as the processor or the like, for determining whether the probe point satisfies an edge projection criteria in order for the probe point to be projected onto the edge. The evaluation as to whether the probe point satisfies the end vertex projection criteria, the internal vertex projection criteria and the edge projection criteria may be performed in any order. Additionally, while the evaluation may include the evaluation of the three projection criteria included herein, the evaluation may alternatively include the evaluation of only one or two of the projection criteria, such as in an instance in which the evaluation of a projection criteria proves to be satisfactory.

Following consideration of the projection of a probe point onto an end polyline vertex, an internal vertex or the edge, the apparatus 10 of the example embodiment of FIG. 2 includes means, such as the processor 12 or the like, for determining whether additional probe points in K remain to be projected onto the edge. See block 32 of FIG. 2. In an instance in which one or more probe points remain to be projected, that is, in an instance in which one or more probe points have not yet been considered for projection onto the edge or its vertices, the apparatus includes means, such as the processor or the like, for selecting a next probe point in K and then repeating the process of projecting the next probe point onto the edge as described above in conjunction with blocks 26-30 of FIG. 2. See block 34. Once all probe points in K have been considered for projection onto the edge or its vertices, the apparatus of an example embodiment also includes means, such as the processor or the like, for determining whether every edge of the polyline has been evaluated for purposes of the projection of the probe points thereonto or whether another edge of the polyline remains to be evaluated for purposes of probe point projection. See block 36. In an instance in which another edge of the polyline remains to be evaluated for probe point projection, the apparatus of an example embodiment includes means, such as the processor or the like, for selecting the next edge of the polyline and then repeating the process of probe point projection as described above in conjunction with blocks 26-30 of FIG. 2. See block 38. However, if each edge of the polyline has been evaluated for purposes of probe point projection, the process of probe point projection depicted in FIG. 2 is considered complete.

In an example embodiment, once a probe point has been projected onto an edge or a vertex of a polyline, the probe point is not removed from consideration in regards to projection of the same probe point onto another edge or vertex of the same polyline or onto an edge or vertex of another polyline representative of another road segment. For a probe point that has been projected onto an edge or a vertex of a polyline, the apparatus 10, such as the processor 12, the memory 14 or the like, associates the projection distance, termed the map matched distance following the projection of the probe point, with the probe point. In this regard, the map matched distance is the distance, such as the perpendicular distance, that the probe point is translated from the location associated with the probe point to the location along the edge or the vertex onto which the probe point is projected. In this regard, it is noted that for edge projection, the map matched distance is the perpendicular projection onto the edge spanning the two vertices, whereas for vertex projection it is the distance from the probe point to the vertex. During subsequent consideration of the same, previously projected probe point in regards to the potential projection of the same probe point onto another edge or vertex of the same polyline or onto an edge or vertex of another polyline, the apparatus, such as the processor, evaluates the probe point based upon a projection criteria that includes the projection distance of the probe point onto another edge or vertex of the same polyline or onto an edge or vertex of another polyline being less than the previous map matched distance in an instance in which the probe point has been previously projected. Thus, if projection distance of the probe point onto another edge or vertex of the same polyline or onto an edge or vertex of another polyline is less than the previous map matched distance, the probe point is projected onto the other edge or vertex of the same polyline or onto the edge or vertex of another polyline and the previous map matching of the same probe point is disregarded or eliminated. By repeatedly considering the probe point with respect to various edges and vertices of the same and different polylines, the probe point is eventually map matched to the closest edge or vertex, even if the probe point was initially map matched to a different, more remote edge or vertex as a result of the order in which the edges of the polylines are evaluated.

As described above, the map matching projection distance may serve as the objective function (subject to the probe point being within the heading tolerance of the direction of travel for the road segment) that, in turn, defines the projection criteria for map matching may incorrectly map match probes especially near bifurcations. In other embodiments, however, the projection criteria may be based on other objective functions in addition to or instead of the map matching projection distance. While a number of different objective functions may be employed, the objective function of another example embodiment is a combination of the projection distance and the angular difference with respect to the probe heading and the edge direction. By also taking heading into consideration in the objective function, such an objective function could allow a probe point to be map matched to a road segment for which the heading matches better even if the map matching projection distance is larger. Furthermore, additional road attributes may also be used in an objective function to improve the likelihood of correct map matching, such as the number of lanes, road width, speed limit, functional class and estimate of typical GPS error at any point along the road. Also, in another example embodiment, a probability based map matching objective function may be used. In this embodiment, a map matching probability map may be created for each projection location along the polyline that assigns a map matching probability value for probe points that project to a location based on the respective map matching projection distance and heading difference with respect to the polyline at the projection location. Using a probability based map matching approach, the probe points are map matched to the polyline yielding the highest probability of being the most likely map match location for the properties of the probe (e.g., location, heading, etc.), although additional properties may be used as well such as, for example, speed and GPS error.

By way of example, FIG. 4 illustrates two adjacent road segments 50 designated A and B. Each road segment is represented by a respective polyline 52. During map matching of probe point 54 designated Q to road segment A, the probe point Q is identified as being within a spatial search region 56 centered about a vertex of the polyline representative of road segment A and is map matched to the polyline representative of road segment A with a projection distance of $d_A$. Thereafter, during map matching with respect to road segment B, the same probe point Q is identified as being within a spatial search region 58 centered about a vertex of the polyline representative of road segment B and is map matched to the polyline representative of road segment B with a projection distance of $d_B$. Since the projection distance of $d_B$ is less than the projections distance $d_A$ as shown in FIG. 4, the prior map matching of probe point Q to the polyline representative of road segment A is eliminated and probe point Q is, instead, map matched to the polyline representative of road segment B.

A probe point may be projected onto an edge of a polyline in various manners. In an example embodiment, however, the apparatus 10, such as the processor 12, is configured to determine if the probe point satisfies the edge projection criteria so as to be projected onto an edge in the manner set forth by FIG. 5. As shown in block 60 of FIG. 5, for example, the apparatus of this example embodiment includes means, such as the processor or the like, for determining a difference angle θ between a heading associated with the probe point and the edge. In an instance in which the road segment represented by the edge is bidirectional, the angle θ is determined for each direction and the smallest value of the angle θ is retained. The apparatus of this example embodiment also includes means, such as the processor or the like, for determining a projection distance $d_{vertex}$ from the probe point to a projection point along the edge. See block 62. By way of example of the projection of the probe point to an edge, reference is now made to FIG. 6 in which probe point Q is projected onto projection point p on the edge extending between vertices $p_0$ and $p_1$ by translating the probe point Q in a direction perpendicular to the edge at projection point p. In an example embodiment, the projection point p is derived by minimizing the vector inner product as follows:

$$d_{min} = |p-q| \text{ when } (Q-p) \cdot (p_1-p_0) = 0$$

Since $p = p_0 + t(p_1 - p_0)$ with t being a projection parameter that parametrically expresses the projection point and defined as shown in FIG. 6 to vary linearly from t=0 at $p_0$ to t=1 at $p_1$, the foregoing equation may be expressed as:

$$[(Q-p_0-t(p_1-p_0)] \cdot (p_1-p_0) = 0$$

which yields the projection point $p = p_0 + t(p_1 - p_0)$ expressed parametrically by t as follows:

$$t = \frac{|(Q-p_0) \cdot (p_1 - p_0)|}{|p_1 - p_0|}$$

The projection distance is thus defined in the example of FIG. 6 as follows:

$$d = |p - q| = \frac{|p_1 - p_0) \times (p_0 - Q)|}{|p_1 - p_0|}$$

In an instance in which the edge is an analytical curve, such as a B-spline curve, the projection point p and projection distance is defined in a comparable manner by minimizing the same inner product, but the line representative of the edge is replaced with the curve tangent vector $p^t$. In this regard, the curve representative of the edge in this example embodiment may be initially approximated by a polyline, such as by use of the Douglas-Peucker algorithm, and an initial projection of the probe point may be performed to obtain an approximate curve projection parameter $t_0$. The curve parameter $t_0$ serves as an initial estimate and is utilized during a numerical optimization process, such as by using the Newton-Raphson algorithm, to minimize:

$$d_{min} = |p-q| \text{ when } (p-q) \cdot p^t = 0$$

wherein $p^t$ is the curve tangent vector at curve parameter t. This expression is analogous to the line projection discussed above.

As described in the foregoing examples, the apparatus 10 of this example embodiment further includes means, such as the processor 12 or the like, for determining a projection parameter t that parametrically expresses the projection point, such as the relative position of the projection point along an edge. See also block 62. The apparatus of this example embodiment also includes means, such as the processor or the like, for projecting the probe point onto the edge in an instance in which the angle is within a heading tolerance, the projection distance is within a map matching tolerance, the projection parameter is within a predefined range and, in an instance in which the probe point has been previously projected, the projection distance of the probe point to the edge is less than the previous map matched distance.

In this regard, and as shown in block 64 of FIG. 5, the apparatus 10 of this example embodiment includes means, such as the processor 12 or the like, for determining, for a respective edge, if the angle θ is less than a heading tolerance. In an instance in which the angle θ is less than a heading tolerance, the apparatus of this example embodiment also includes means, such as the processor or the like, for determining if the projection distance $d_{vertex}$ is less than a map matching tolerance T. See block 66. In an instance in which the projection distance $d_{vertex}$ is less than the map matching tolerance T, the apparatus of this example embodiment further includes means, such as the processor or the like, for determining if the projection parameter is within a predefined range, such as between 0 and 1 as described in conjunction with the foregoing example. See block 68. In an instance in which the projection parameter is within the predefined range, the apparatus of this example embodiment additionally includes means, such as the processor or the like, for determining if the projection distance $d_{vertex}$ is less than any and all previous map matched distances. See block 70.

In an instance in which the projection distance $d_{vertex}$ is less than any and all previous map matched distances, the apparatus 10 includes means, such as the processor 12 or the memory 14 or the like, for updating the closest point information, such as by storing the closest point information, including the map matched distance and the location along the edge to which the probe point is projected, in memory 14. See block 72. In this regard, the update of the closest point information would indicate that the probe point is closest to and is projected onto the respective edge of the polyline. In addition, the closest point information may include the map matched distance of the probe point, that is, the projection distance of the probe to the respective edge. As such, the closest point information is associated with a probe point and may be subsequently referenced during consideration of the projection of the same probe point onto a vertex of the same polyline or onto the edge or vertex of another polyline. As also shown in FIG. 5, following the updating of the closest point information or in an instance in which the angle θ is not less than the heading tolerance, the projection distance $d_{vertex}$ is not less than a map matching tolerance T, the projection parameter is not within the predefined range or the projection distance $d_{vertex}$ is not less than any and all previous map matched distances, the foregoing process for determining whether the probe point satisfies the edge projection criteria is considered complete.

A probe point may also be projected onto an end polyline vertex in various manners. In an example embodiment, however, the apparatus 10, such as the processor 12, is configured to determine if the probe point satisfies the end vertex projection criteria so as to be projected onto an end polyline vertex in the manner set forth by FIG. 7. As shown in block 80 of FIG. 7, for example, the apparatus of this example embodiment includes means, such as the processor or the like, for determining a projection parameter for each edge that intersects at the end polyline vertex. The projection parameter for a respective edge parametrically expresses a projection point at which the probe point is projected onto the end polyline vertex, the respective edge or an extension of the respective edge beyond the end polyline vertex. The apparatus, such as the processor, of an example embodiment is configured to determine the projection parameter in the manner described above, although the projection point for a respective edge is the point at which the probe point is projected perpendicularly onto the respective edge or an extension of the respective edge beyond end polyline vertex. As such, the probe point may be projected perpendicularly onto the respective edge in an instance in which 0<t<1, the end polyline vertex in an instance in which t=0 or t=1 or the extension of the respective edge in which t<0 or t>1.

With reference to FIG. 6, for example in which first and second edges intersect at an end polyline vertex, the projection parameter for a first edge [$p_0$, $p_1$] is designated t, while the projection parameter for a second edge [$p_1$, $p_2$] is designated u. As shown, the probe point is projected onto the end polyline vertex in an instance in which t=1 or u=0, and the probe point is defined to fall within the shaded region VR (as defined between lines extending perpendicularly to the first and second edges at the end polyline vertex) in an instance in which t>1 and u<0 for the first and second edges, respectively, thereby indicated that the probe point projects perpendicularly onto extensions of both the first and second edges.

As shown in block 82 of FIG. 7, the apparatus 10 of this example embodiment also includes means, such as the processor 12 or the like, for determining whether the projection parameter satisfies a predefined criteria, such as in an instance in which t=1 or u=0 and in an instance in which t>1 and u<0 for the first and second edges, respectively. In an instance in which the projection parameter does not satisfy the predefined criteria, the probe point may be determined not to satisfy the end vertex projection criteria. However, in an instance in which the projection parameter satisfies the predefined criteria, the apparatus further includes means, such as the processor or the like, for determining, for each end polyline vertex, a difference angle $\theta_j$ for each allowable turn maneuver from the road segment that the edge under evaluation represents onto another road segment. See block 84. In an example embodiment, the difference angle $\theta_j$ for an allowable turn maneuver is the angle between the heading associated with the probe point and the average direction of the two edges representative of the road segments that meet at the end polyline vertex and are used to affect the turn maneuver. In an instance in which one or both of the road segments are bidirectional, the edge direction that corresponds to the allowable turn maneuver is utilized in the determination of the average direction of the two edges. As such, a set of difference angles {$\theta_1, \ldots, \theta_j$} are defined, one for each allowable turn maneuver.

The difference angle may be determined differently in other embodiments. For example, for vertices, both internal and end vertices, the heading reference direction need not be defined as the average direction of the two edges that meet at a vertex, but may, instead, be defined based upon a continuously changing vertex reference direction. In this embodiment, the difference angle $\theta_j$ may be defined as the angle to the perpendicular tangent line TL of the projection line PL of probe point Q to the end vertex P, as shown in FIG. 8. As a result, a dynamic reference direction TL is defined between the two edges depending on where the point is located within the vertex projection region as shaded in FIG. 8. If probe point Q moved through the shaded vertex projection region, the angle of the projection line PL and thus the perpendicular tangent line TL would continuously change direction through a range of the heading directions of the two vertex edges. As a result, the determination of the difference angle in this manner may model the changing heading behavior of a smooth analytic curve.

The apparatus 10 of this example embodiment also includes means, such as the processor 12 or the like, for determining a projection distance $d_{vertex}$ from the probe point to each end polyline vertex, that is, the shortest distance from the probe point to each end polyline vertex. See block 86. For each allowable turn maneuver, the apparatus includes means, such as the processor or the like, for projecting the probe point onto the end polyline vertex in an instance in which the difference angle is within a heading tolerance, the projection distance is within a matching tolerance and, in an instance in which the probe point has been previously projected, the projection distance of the probe point to the end polyline vertex is less than the previous map matched distance.

In this regard, and as shown in block 88 of FIG. 5, the apparatus 10 of this example embodiment includes means, such as the processor 12 or the like, for determining, for an allowable turn maneuver, if the difference angle $\theta_j$ is less than a heading tolerance. The heading tolerance may be predefined, such as 15°, 20° or 25°, and, in some embodiment may be a function of the class of road represented by the polyline. In an instance in which the difference angle $\theta_j$ is less than a heading tolerance, the apparatus of this example embodiment also includes means, such as the processor or the like, for determining if the projection distance $d_{vertex}$ is less than a map matching tolerance T. See block 90. The map matching tolerance may be predefined and provided by the navigation or other application for which the map matching is being performed. In an example embodiment, the map matching tolerance is a function of the class of road represented by the polyline. In an instance in which the projection distance $d_{vertex}$ is less than the map matching tolerance T, the apparatus of this example embodiment further includes means, such as the processor or the like, for determining if the projection distance $d_{vertex}$ is less than any and all previous map matched distances. See block 92. In an instance in which the projection distance $d_{vertex}$ is less than any and all previous map matched distances, the apparatus includes means, such as the processor, or the memory or the like, for updating the closest point information, such as by storing the closest point information in memory 14. See block 94. In this regard, the update of the closest point information would indicate that the probe point is closest to and is projected onto the respective end polyline vertex of the respective edge of the polyline. In addition, the closest point information may include the map matched distance of the probe point, that is, the projection distance of the probe to the respective end polyline vertex. As such, the closest point information is associated with a probe point and may be subsequently referenced during consideration of the projection of the same probe point onto another vertex of the same polyline or onto the edge or vertex of another polyline.

In a number of instances, the probe point is projected onto an end polyline vertex by translating the probe point in a direction perpendicular to the edge from its location to the end polyline vertex. However, in some instances, the projection of the probe point to an end polyline vertex will be in a non-perpendicular direction relative to the edge. In this regard, FIG. 6 depicts an edge of a polyline extending between end polyline vertices $p_0$ and $p_1$. At least for probe points located within the shadow region VR proximate end polyline vertex $p_1$, the probe points will be projected to end polyline vertex $p_1$ in a non-perpendicular direction relative to the edge. More particularly, end polyline vertex p1 is at the intersection of a first edge that extends between end polyline vertices $p_0$ and $p_1$ parameterized as described below from t≥0 to t≤1 and a second edge that extends between end polyline vertices $p_1$ and $p_2$ parameterized from u≥0 to u≤1. As such, the projection of probe points within region VR onto the end polyline vertex will yield t>1 and u<0 with respect to the first and second edges, respectively, such that the probe points within region VR will remain projected onto the end polyline vertex and will not be projected onto an internal vertex or an edge since the projection parameter t will fall outside the predefined range, as also described below.

After updating the closest point of information or in an instance in which the difference angle $\theta_j$ is not less than the heading tolerance, the projection distance $d_{vertex}$ is not less than a map matching tolerance T or the projection distance $d_{vertex}$ is not less than any previous map matched distance, the apparatus 10 includes means, such as the processor 12 or the like, for determining if all allowable turn maneuvers onto other road segments that intersect the road segment in question at the end polyline vertex have been considered. See block 96 of FIG. 7. If all allowable turn maneuvers have not been considered, the apparatus of this example embodiment includes means, such as the processor or the like, for selecting another allowable turn maneuver as shown in block 98 and then repeating the foregoing process for determining if the closest point information should be updated as shown in blocks 88-94. However, if all allowable turn maneuvers have been considered for purposes of updating the closest point information, the apparatus of this example embodiment includes means, such as the processor or the like, for determining if both end polyline vertices have been considered. See block 100. In an instance in which both end polyline vertices have not been considered, the apparatus includes means, such as the processor or the like, for selecting the other end polyline vertex as shown in block 102 and then repeating the process of determining whether the closest point information should be updated as shown in blocks 88-94. However, if both end polyline vertices have been considered for purposes of updating the closest point information, the foregoing process for determining whether the probe point satisfies the end vertex projection criteria is considered complete.

A probe point may also be projected onto an internal vertex in various manners. In an example embodiment, however, the apparatus 10, such as the processor 12, is configured to determine if the probe point satisfies the internal vertex projection criteria so as to be projected onto an internal vertex in the manner set forth by FIG. 9. As shown in block 110 of FIG. 9, for example, the apparatus of this example embodiment includes means, such as the processor or the like, for determining a projection parameter for each edge that intersects the internal vertex. The projection parameter for a respective edge parametrically expresses a projection point at which the probe point is projected onto the internal vertex, the respective edge or an extension of the respective edge beyond the internal vertex. The apparatus of this example embodiment also includes means, such as the processor or the like, for determining whether the projection parameter satisfies a predefined criteria, such as in an instance in which t=1 or u=0 and in an instance in which t>1 and u<0 for the first and second edges, respectively. See block 112. In an instance in which the projection parameter does not satisfy the predefined criteria, the probe point may be determined not to satisfy the internal vertex projection criteria. However, in an instance in which the projection parameter satisfies the predefined criteria, the apparatus further includes means, such as the processor or the like, for determining a difference angle $\theta$ for each internal vertex. See block 114. In regards to an internal vertex, the difference angle $\theta$ is defined as the angle between the heading associated with the probe point and the average direction of the two edges that intersect at the internal vertex. In an instance in which the road segment is bidirectional, the difference angle $\theta$ is determined for each direction and the smallest value of the difference angle $\theta$ is retained.

The apparatus of this example embodiment also includes means, such as the processor or the like, for determining a projection distance $d_{vertex}$ from the probe point to each internal vertex. See block 116. The apparatus of this example embodiment also includes means, such as the processor or the like, for projecting the probe point onto a respective internal vertex in an instance in which the difference angle is within a heading tolerance, the projection distance is within a map matching tolerance and, in an instance in which the probe point has been previously projected, the projection distance of the probe point to the respective internal vertex is less than the previous map matched distance.

In this regard, and as shown in block 118 of FIG. 9, the apparatus 10 of this example embodiment includes means, such as the processor 12 or the like, for determining, for a respective internal vertex, if the difference angle $\theta$ is less than a heading tolerance. In an instance in which the difference angle $\theta$ is less than a heading tolerance, the apparatus of this example embodiment also includes means, such as the processor or the like, for determining if the projection distance $d_{vertex}$ is less than a map matching tolerance T. See block 120. In an instance in which the projection distance $d_{vertex}$ is less than the map matching tolerance T, the apparatus of this example embodiment further includes means, such as the processor or the like, for determining if the projection distance $d_{vertex}$ is less than any and all previous map matched distances. See block 122. In an instance in which the projection distance $d_{vertex}$ is less than any and all previous map matched distances, the apparatus includes means, such as the processor, or the memory or the like, for updating the closest point information, such as by storing the closest point information, including the map matched distance, in memory 14. See block 124.

After updating the closest point of information or in an instance in which the difference angle $\theta$ is not less than the heading tolerance, the projection distance $d_{vertex}$ is not less than a map matching tolerance T or the projection distance $d_{vertex}$ is not less than any previous map matched distance, the apparatus 10 includes means, such as the processor 12 or the like, for determining if all internal vertices of the respective edge have been considered. See block 126 of FIG. 9. If all internal vertices have not been considered, the apparatus of this example embodiment includes means, such as the processor or the like, for selecting another internal vertex as shown in block 128 and then repeating the foregoing process for determining if the closest point information should be updated as shown in blocks 118-124. However, if all internal vertices of the respective edge have been considered for purposes of updating the closest point information, the foregoing process for determining whether the probe point satisfies the internal vertex projection criteria is considered complete. Although the evaluation of the end vertex projection criteria and the internal vertex projection criteria are separately described herein, the evaluation of the end vertex projection criteria and the internal vertex projection criteria may be combined in other example embodiments.

By repeating for each polyline the foregoing process of projecting the probe points onto the edges and vertices of the respective polylines, the probe points may be map matched to the polylines in an efficient manner. In this regard, by providing for the projection of the probe points based upon spatial searches that are defined about the vertices of the polylines and not about the probe points, the map matching of example embodiments of the present invention is map-centric such that the computational resources that are required for map matching are no longer proportional to the number of probe points. Thus, particularly as the number of probe points to be map matched increases, the method, apparatus and computer program product of example embodiments efficiently project the probe points onto the polylines while consuming, in a number of instances, fewer computational resources and time than would have been required if the spatial searches were, instead, based upon the location of the various probe points.

The efficiency of the process may be further improved by filtering the probe points prior to the evaluation of the probe point for purposes of the projection of the probe points onto a polyline. In this regard, the apparatus 10, such as the processor 12, of an example embodiment may filter the probe points, such as by eliminating probe points from further consideration that are associated with speeds that fall below a predefined minimum threshold, e.g., five miles per hour, that are far from the polylines or that is associated with a GPS error, such as a Dilution of Precision (DOP), that exceeds a predefined error limit. By filtering the probe points in this manner, the resulting projection of the remaining probe points onto the polylines can be performed with improved efficiency.

Additionally, the accuracy of the map matching process may be enhanced by utilizing trajectory information to identify map matching errors. For example, the trajectory associated with the probe points may be compared to the trajectory of the road segment at the projection point p. In an instance in which the trajectory associated with a probe point differs from the trajectory of the road segment at the projection point p by at least a predefined differential, the map matching of the probe point may be determined to be in error with the projection point discarded. Further, probabilistic map matching algorithms may also be utilized using speed and/or other parameters associated with the probe points to increase the confidence in the projection points to which the probe points are matched.

FIGS. 2, 5, 7 and 9 illustrate flowcharts of an apparatus, method and computer program product according to example embodiments of the invention. It will be understood that each block of the flowcharts, and combinations of blocks in the flowcharts, may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an embodiment of the present invention and executed by a processor 12 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, some of which have been described above. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method implemented by an advanced driver assistance system (ADAS) or a navigation system, the method comprising:

defining a plurality of vertices along a polyline representative of a road segment such that the polyline comprises one or more edges, wherein each edge extends between a pair of neighboring vertices;

for each vertex of a respective edge, spatially searching to identify each probe point within a region about a respective vertex;

for each probe point identified within the region about a respective vertex, determining whether the probe point satisfies a projection criteria in order for the probe point to be projected onto the edge or one of the neighboring vertices between which the edge extends, thereby providing for map-centric map matching of the probe point; and causing a location of a vehicle to be depicted upon a map or causing traffic to be estimated based on projection of the probe point.

2. A method according to claim 1 wherein the projection criteria comprises a projection distance of the probe point being less than a previous map matched distance in an instance in which the probe point has been previously projected.

3. A method according to claim 1 further comprising determining a spatial search separation distance at least partially based upon a map matching tolerance, and wherein defining the plurality of vertices comprises inserting one or more internal vertices along the polyline in an instance in which a length of an edge exceeds the spatial search separation distance.

4. A method according to claim 1 wherein determining whether the probe point satisfies the projection criteria comprises one or more of:
   in an instance in which one or both of the neighboring vertices of the respective edge is an end polyline vertex, determining whether the probe point satisfies an end vertex projection criteria in order for the probe point to be projected onto the end polyline vertex;
   in an instance in which one or both of the neighboring vertices of the respective edge is an internal vertex, determining whether the probe point satisfies an internal vertex projection criteria in order for the probe point to be projected onto the internal vertex; and
   determining whether the probe point satisfies an edge projection criteria in order for the probe point to be projected onto the edge.

5. A method according to claim 4 wherein determining whether the probe point satisfies the end vertex projection criteria comprises:
   determining a projection parameter for each edge that intersects at the end polyline vertex, wherein the projection parameter for a respective edge parametrically expresses a projection point at which the probe point is projected onto the end polyline vertex, the respective edge or an extension of the respective edge beyond the end polyline vertex;
   determining a difference angle for each allowable turn maneuver from the road segment onto another road segment;
   determining a projection distance from the probe point to the end polyline vertex; and
   for each allowable turn maneuver, projecting the probe point onto the end polyline vertex in an instance in which the projection parameter satisfies a predefined criteria, the difference angle is within a heading tolerance, the projection distance is within a map matching tolerance and, in an instance in which the probe point has been previously projected, the projection distance of the probe point to the end polyline vertex is less than a previous map matched distance.

6. A method according to claim 4 wherein determining whether the probe point satisfies the internal vertex projection criteria comprises:
   determining a projection parameter for each edge that intersects at the internal vertex, wherein the projection parameter for a respective edge parametrically expresses a projection point at which the probe point is projected onto the internal vertex, the respective edge or an extension of the respective edge beyond the internal vertex;
   determining a difference angle for the probe point;
   determining a projection distance from the probe point to each internal vertex; and
   projecting the probe point onto a respective internal vertex in an instance in which the projection parameter satisfies a predefined criteria, the difference angle is within a heading tolerance, the projection distance is within a map matching tolerance and, in an instance in which the probe point has been previously projected, the projection distance of the probe point to the respective internal vertex is less than a previous map matched distance.

7. A method according to claim 4 wherein determining whether the probe point satisfies the edge projection criteria comprises:
   determining an angle between a heading associated with the probe point and the edge;
   determining a projection distance from the probe point to a projection point along the edge;
   determining a projection parameter that parametrically expresses the projection point; and
   projecting the probe point onto the edge in an instance in which the angle is within a heading tolerance, the projection distance is within a map matching tolerance, the projection parameter is within a predefined range and, in an instance in which the probe point has been previously projected, the projection distance of the probe point to the edge is less than a previous map matched distance.

8. An apparatus of an advanced driver assistance system (ADAS) or a navigation system, the apparatus comprising at least one processor and at least one memory including computer program code, the at least one memory and computer program code configured to, with the processor, cause the apparatus to at least:
   define a plurality of vertices along a polyline representative of a road segment such that the polyline comprises one or more edges, wherein each edge extends between a pair of neighboring vertices;
   for each vertex of a respective edge, spatially search to identify each probe point within a region about a respective vertex;
   for each probe point identified within the region about a respective vertex, determine whether the probe point satisfies a projection criteria in order for the probe point to be projected onto the edge or one of the neighboring vertices between which the edge extends, thereby providing for map-centric map matching of the probe point; and
   cause a location of a vehicle to be depicted upon a map or cause traffic to be estimated based on projection of the probe point.

9. An apparatus according to claim 8 wherein the projection criteria comprises a projection distance of the probe point being less than a previous map matched distance in an instance in which the probe point has been previously projected.

10. An apparatus according to claim 8 wherein the at least one memory and computer program code are further configured to, with the processor, cause the apparatus to determine a spatial search separation distance at least partially based upon a map matching tolerance, and wherein the at least one memory and computer program code are configured to, with the processor, cause the apparatus to define the plurality of vertices by inserting one or more internal vertices along the polyline in an instance in which a length of an edge exceeds the spatial search separation distance.

11. An apparatus according to claim 8 wherein the at least one memory and computer program code are configured to, with the processor, cause the apparatus to determine whether the probe point satisfies the projection criteria by one or more of:
   in an instance in which one or both of the neighboring vertices of the respective edge is an end polyline vertex, determining whether the probe point satisfies an end vertex projection criteria in order for the probe point to be projected onto the end polyline vertex;
in an instance in which one or both of the neighboring vertices of the respective edge is an internal vertex, determining whether the probe point satisfies an internal vertex projection criteria in order for the probe point to be projected onto the internal vertex; and
determining whether the probe point satisfies an edge projection criteria in order for the probe point to be projected onto the edge.

12. An apparatus according to claim 11 wherein the at least one memory and computer program code are configured to, with the processor, cause the apparatus to determine whether the probe point satisfies the end vertex projection criteria by:
determining a projection parameter for each edge that intersects at the end polyline vertex, wherein the projection parameter for a respective edge parametrically expresses a projection point at which the probe point is projected onto the end polyline vertex, the respective edge or an extension of the respective edge beyond the end polyline vertex;
determining a difference angle for each allowable turn maneuver from the road segment onto another road segment;
determining a projection distance from the probe point to the end polyline vertex; and
for each allowable turn maneuver, projecting the probe point onto the end polyline vertex in an instance in which the difference angle is within a heading tolerance, the projection distance is within a map matching tolerance and, in an instance in which the probe point has been previously projected, the projection distance of the probe point to the end polyline vertex is less than a previous map matched distance.

13. An apparatus according to claim 11 wherein the at least one memory and computer program code are configured to, with the processor, cause the apparatus to determine whether the probe point satisfies the internal vertex projection criteria by:
determining a projection parameter for each edge that intersects at the internal vertex, wherein the projection parameter for a respective edge parametrically expresses a projection point at which the probe point is projected onto the internal vertex, the respective edge or an extension of the respective edge beyond the internal vertex;
determining a difference angle for the probe point;
determining a projection distance from the probe point to each internal vertex; and
projecting the probe point onto a respective internal vertex in an instance in which the difference angle is within a heading tolerance, the projection distance is within a map matching tolerance and, in an instance in which the probe point has been previously projected, the projection distance of the probe point to the respective internal vertex is less than a previous map matched distance.

14. An apparatus according to claim 11 wherein the at least one memory and computer program code are configured to, with the processor, cause the apparatus to determine whether the probe point satisfies the edge projection criteria by:
determining an angle between a heading associated with the probe point and the edge;
determining a projection distance from the probe point to a projection point along the edge;
determining a projection parameter that parametrically expresses the projection point; and
projecting the probe point onto the edge in an instance in which the angle is within a heading tolerance, the projection distance is within a map matching tolerance, the projection parameter is within a predefined range and, in an instance in which the probe point has been previously projected, the projection distance of the probe point to the edge is less than a previous map matched distance.

15. A computer program product of an advanced driver assistance system (ADAS) or a navigation system, the computer program product comprising at least one non-transitory computer-readable storage medium having computer-executable program code portions stored therein, the computer-executable program code portions comprising program code instructions configured to:
define a plurality of vertices along a polyline representative of a road segment such that the polyline comprises one or more edges, wherein each edge extends between a pair of neighboring vertices;
for each vertex of a respective edge, spatially search to identify each probe point within a region about a respective vertex;
for each probe point identified within the region about a respective vertex, determine whether the probe point satisfies a projection criteria in order for the probe point to be projected onto the edge or one of the neighboring vertices between which the edge extends, thereby providing for map-centric map matching of the probe point; and
cause a location of a vehicle to be depicted upon a map or cause traffic to be estimated based on projection of the probe point.

16. A computer program product according to claim 15 wherein the computer-executable program code portions further comprise program code instructions configured to determine a spatial search separation distance at least partially based upon a map matching tolerance, and wherein the program code instructions configured to define the plurality of vertices comprise program code instructions configured to insert one or more internal vertices along the polyline in an instance in which a length of an edge exceeds the spatial search separation distance.

17. A computer program product according to claim 15 wherein the program code instructions configured to determine whether the probe point satisfies the projection criteria comprise one or more of program code instructions configured to:
in an instance in which one or both of the neighboring vertices of the respective edge is an end polyline vertex, determine whether the probe point satisfies an end vertex projection criteria in order for the probe point to be projected onto the end polyline vertex;
in an instance in which one or both of the neighboring vertices of the respective edge is an internal vertex, determine whether the probe point satisfies an internal vertex projection criteria in order for the probe point to be projected onto the internal vertex; and
determine whether the probe point satisfies an edge projection criteria in order for the probe point to be projected onto the edge.

18. A computer program product according to claim 17 wherein the program code instructions configured to determine whether the probe point satisfies the end vertex projection criteria comprise program code instructions configured to:

determine a projection parameter for each edge that intersects at the end polyline vertex, wherein the projection parameter for a respective edge parametrically expresses a projection point at which the probe point is projected onto the end polyline vertex, the respective edge or an extension of the respective edge beyond the end polyline vertex;

determine a difference angle for each allowable turn maneuver from the road segment onto another road segment;

determine a projection distance from the probe point to the end polyline vertex; and for each allowable turn maneuver, project the probe point onto the end polyline vertex in an instance in which the difference angle is within a heading tolerance, the projection distance is within a map matching tolerance and, in an instance in which the probe point has been previously projected, the projection distance of the probe point to the end polyline vertex is less than a previous map matched distance.

19. A computer program product according to claim 17 wherein the program code instructions configured to determine whether the probe point satisfies the internal vertex projection criteria comprise program code instructions configured to:

determine a projection parameter for each edge that intersects at the internal vertex, wherein the projection parameter for a respective edge parametrically expresses a projection point at which the probe point is projected onto the internal vertex, the respective edge or an extension of the respective edge beyond the internal vertex;

determine a difference angle for the probe point;

determine a projection distance from the probe point to each internal vertex; and project the probe point onto a respective internal vertex in an instance in which the difference angle is within a heading tolerance, the projection distance is within a map matching tolerance and, in an instance in which the probe point has been previously projected, the projection distance of the probe point to the respective internal vertex is less than a previous map matched distance.

20. A computer program product according to claim 17 wherein the program code instructions configured to determine whether the probe point satisfies the edge projection criteria comprise program code instructions configured to:

determine an angle between a heading associated with the probe point and the edge;

determine a projection distance from the probe point to a projection point along the edge;

determine a projection parameter that parametrically expresses the projection point; and project the probe point onto the edge in an instance in which the angle is within a heading tolerance, the projection distance is within a map matching tolerance, the projection parameter is within a predefined range and, in an instance in which the probe point has been previously projected, the projection distance of the probe point to the edge is less than a previous map matched distance.

* * * * *

UNITED STATES PATENT AND TRADEMARK OFFICE
CERTIFICATE OF CORRECTION

PATENT NO.        : 10,288,434 B2
APPLICATION NO.   : 14/752159
DATED             : May 14, 2019
INVENTOR(S)       : Ole Henry Dorum Page 1 of 1

It is certified that error appears in the above-identified patent and that said Letters Patent is hereby corrected as shown below:

On the Title Page

Item (71), "Veldhoven" should read --Eindhoven--

Signed and Sealed this
Nineteenth Day of November, 2019

Andrei Iancu
*Director of the United States Patent and Trademark Office*